United States Patent
Iinuma

(10) Patent No.: US 11,226,544 B2
(45) Date of Patent: Jan. 18, 2022

(54) CONTROL DEVICE, CONTROL METHOD AND PROGRAM

(71) Applicant: SZ DJI TECHNOLOGY CO., LTD., Shenzhen (CN)

(72) Inventor: Futoshi Iinuma, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/024,417

(22) Filed: Sep. 17, 2020

(65) Prior Publication Data

US 2021/0003906 A1 Jan. 7, 2021

Related U.S. Application Data

(63) Continuation of application No. PCT/CN2019/082495, filed on Apr. 12, 2019.

(51) Int. Cl.
*G03B 17/12* (2021.01)
*G03B 17/56* (2021.01)
*H04N 5/225* (2006.01)

(52) U.S. Cl.
CPC .......... *G03B 17/12* (2013.01); *G03B 17/566* (2013.01); *H04N 5/2252* (2013.01); *H04N 5/2253* (2013.01)

(58) Field of Classification Search
None
See application file for complete search history.

(56) References Cited

U.S. PATENT DOCUMENTS

| | | | | |
|---|---|---|---|---|
| 2008/0158355 A1* | 7/2008 | Jodan | ........... | H04N 5/2259 348/143 |
| 2020/0409241 A1* | 12/2020 | Iinuma | ........... | G02B 27/642 |
| 2021/0003906 A1* | 1/2021 | Iinuma | ........... | H04N 17/002 |

FOREIGN PATENT DOCUMENTS

| | | | |
|---|---|---|---|
| CN | 205485227 U | 8/2016 | |
| CN | 206125456 U | 4/2017 | |
| CN | 107466471 A | 12/2017 | |
| CN | 107806979 A | 3/2018 | |
| JP | H0918776 A | 1/1997 | |
| JP | 2016017993 A | 2/2016 | |
| JP | 2016109893 A | 6/2016 | |
| JP | 2017214044 A | 12/2017 | |
| JP | 2018056636 A | 4/2018 | |

OTHER PUBLICATIONS

The World Intellectual Property Organization (WIPO) International Search Report for PCT/CN2019/082495 dated Jul. 11, 2019 4 Pages (including translation).

* cited by examiner

*Primary Examiner* — William B Perkey
(74) *Attorney, Agent, or Firm* — Anova Law Group, PLLC

(57) ABSTRACT

A control device for controlling a photographing system includes a detector configured to detect whether a support is mounted at the photographing system. The support is configured to support a lens mount to maintain a position of the lens mount relative to a main body of the photographing system. The photographing system further includes an image sensor and a support mechanism configured to rotatably support the lens mount and the image sensor. The control device further includes a controller configured to control the support mechanism to restrict a rotation of the lens mount and the image sensor in response to the detector (Continued)

detecting that the support is mounted at the photographing system.

20 Claims, 11 Drawing Sheets

CONTROL DEVICE, CONTROL METHOD AND PROGRAM

CROSS-REFERENCE TO RELATED APPLICATIONS

This application is a continuation of International Application No. PCT/CN2019/082495, filed Apr. 12, 2019, which claims priority to Japanese Application No. 2018-076654, filed Apr. 12, 2018, the entire contents of both of which are incorporated herein by reference.

TECHNICAL FIELD

The present disclosure relates to a control device, a control method and a program.

BACKGROUND

Patent Document 1 discloses a gimbal rotatably supporting a shooting device along a pitch direction and a yaw direction, and a camera base holding the gimbal.

Patent Document 1: Japanese Patent Application Publication No. H9-18776.

Various types of lenses can be mounted to a shooting device rotatably supported by a support mechanism, e.g., a gimbal. Depending on the type of the lens, it is sometimes difficult for the support mechanism to stably support the lens. However, in a scenario where the support mechanism supports the lens, if the support mechanism attempts to rotate the lens unit, a load may be placed on the support mechanism.

SUMMARY

In accordance with the disclosure, there is provided a control device for controlling a photographing system including a detector configured to detect whether a support is mounted at the photographing system. The support is configured to support a lens mount to maintain a position of the lens mount relative to a main body of the photographing system. The photographing system further includes an image sensor and a support mechanism configured to rotatably support the lens mount and the image sensor. The control device further includes a controller configured to control the support mechanism to restrict a rotation of the lens mount and the image sensor in response to the detector detecting that the support is mounted at the photographing system.

Also in accordance with the disclosure, there is provided a method for controlling a photographing system including detecting whether a support is mounted at the photographing system. The support is configured to support a lens mount to maintain a position of the lens mount relative to a main body of the photographing system. The photographing system further includes an image sensor and a support mechanism configured to rotatably support the lens mount and the image sensor. The method further includes controlling the support mechanism to restrict a rotation of the lens mount and the image sensor in response to detecting that the support is mounted at the photographing system.

Also in accordance with the disclosure, there is provided a non-transitory computer-readable storage medium storing a program that, when executed by a processor, causes the processor to detect whether a support is mounted at the photographing system. The support is configured to support a lens mount to maintain a position of the lens mount relative to a main body of the photographing system. The photographing system further includes an image sensor and a support mechanism configured to rotatably support the lens mount and the image sensor. The program further causes the processor to control the support mechanism to restrict a rotation of the lens mount and the image sensor in response to detecting that the support is mounted at the photographing system.

DESCRIPTION OF REFERENCE NUMERALS

Figure 1:
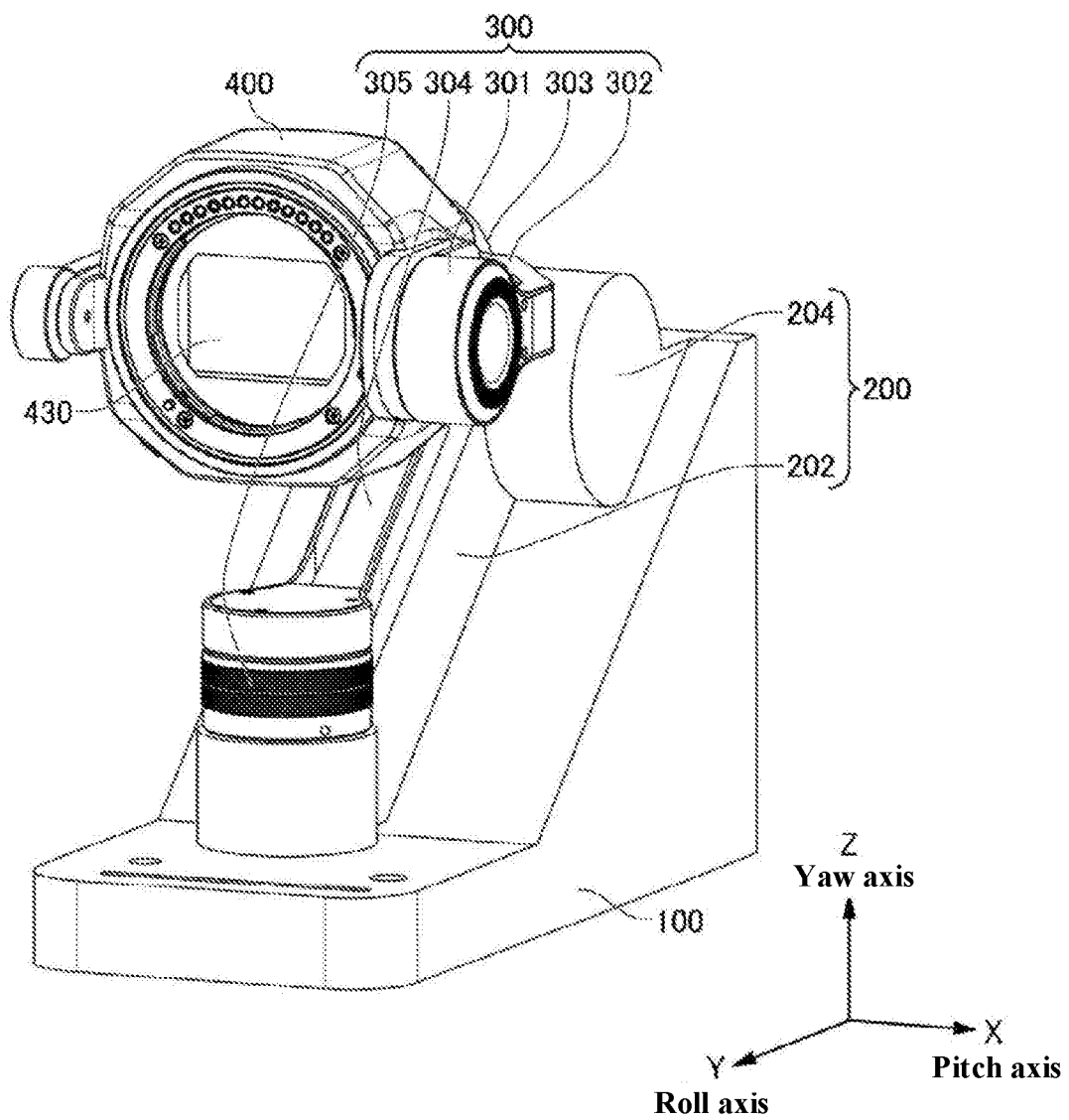
FIG. 1 is a schematic perspective view of an example camera system consistent with embodiments of the disclosure.

| | | | |
|---|---|---|---|
| 10 | Camera system | 100 | Main body |
| 110 | Main body controller | 112 | Detector |
| 114 | Gimbal controller | 116 | Acquisition circuit |
| 118 | Setting circuit | 120 | Memory |
| 130 | Rail | 132 | Detection sensor |
| 140 | Fixing surface | 150 | Support |
| 151 | Mark | 152 | Bolt |
| 154 | Bottom side | 155 | Rail |
| 156 | Pin | 159 | Through hole |
| 200 | Holding mechanism | 202 | Holding member |
| 204 | Rotation member | 300 | Gimbal |
| 301 | Rotation member | 303 | Rotation member |
| 305 | Rotation member | 302 | Support member |
| 304 | Support member | 400 | Lens mount |
| 410 | Imaging controller | 420 | Memory |
| 430 | Image sensor | 440 | Acceleration sensor |
| 450 | Lock pin | 500 | Mount adapter |
| 510 | Adapter controller | 520 | Memory |
| 530 | Lock pin | 600 | Lens unit |
| 610 | Lens driver | 612 | Lens |
| 620 | Lens controller | 630 | Memory |
| 1200 | Computer | 1210 | Host controller |

| | | | |
|---|---|---|---|
| 1212 | CPU | 1214 | RAM |
| 1220 | Input/output controller | 1222 | Communication interface |
| 1230 | ROM | | |

DETAILED DESCRIPTION OF THE EMBODIMENTS

Hereinafter, example embodiments will be described to illustrate the present disclosure, but the disclosed embodiments are not intended to limit the scope of the claims. Not all of the combinations of features described in the embodiments are necessary for a solution of the present disclosure. Changes, modifications, alterations, and variations of the above-described embodiments may be made by those skilled in the art and should fall within the scope of the present disclosure.

Various embodiments of the present disclosure will be described with reference to the accompanying flowcharts and block diagrams. Blocks can represent stages in a process of performing operations or include "components" of a device that performs roles of the operations. The designated stages and "components" can be implemented by a programmable circuit and/or a processor. Dedicated circuits may include digital and/or analog hardware circuits or may include integrated circuits (ICs) and/or discrete circuits. The programmable circuit may include a reconfigurable hardware circuit. The reconfigurable hardware circuit can include a logical AND, a logical OR, a logical XOR, a logical NAND, a logical NOR, and/or another logical operation, as well as a storage element, for example, a flip-flop, a register, a field programmable gate array (FPGA), a programmable logic array (PLA), or the like.

The computer-readable medium may include any tangible device storing instructions that can be executed by a suitable device. The computer-readable medium storing instructions can include a product including instructions that can be executed to create means for performing operations specified by the flowcharts or block diagrams. The computer-readable medium may include, for example, an electronic storage medium, a magnetic storage medium, an optical storage medium, an electromagnetic storage medium, a semiconductor storage medium, or the like. The computer-readable medium may include, for example, a floppy disk (registered trademark), a hard disk, an random access memory (RAM), a read only memory (ROM), an erasable programmable read only memory (EPROM or flash memory), an electrically erasable programmable read-only memory (EEPROM), a static random access memory (SRAM), a compact disc read-only memory (CD-ROM), a digital versatile disc (DVD), a Blu-ray™ disc, a memory stick, an integrated circuit card, or the like.

The computer-readable instructions may include any one of the source codes or the object codes described by any combination of one or more programming languages. The source codes or object codes can include traditional procedural programming languages. Traditional procedural programming languages can include assembly instructions, instruction set architecture (ISA) instructions, machine instructions, machine-related instructions, microcode, firmware instructions, status setting data, or an object-oriented programming language such as Smalltalk, JAVA (registered trademark), or C++, or "C" programming language, or the like. The computer-readable instructions may be provided locally or via a wide area network (WAN), e.g., a local area network (LAN) or the Internet, to a processor or programmable circuit of a general-purpose computer, a special-purpose computer, or another programmable data processing device. The processor or programmable circuit can execute the computer-readable instructions to create means for performing the operations specified in the flowcharts or block diagrams. The processor can include a computer processor, a processing unit, a microprocessor, a digital signal processor, a controller, a microcontroller, or the like.

Figure 2:
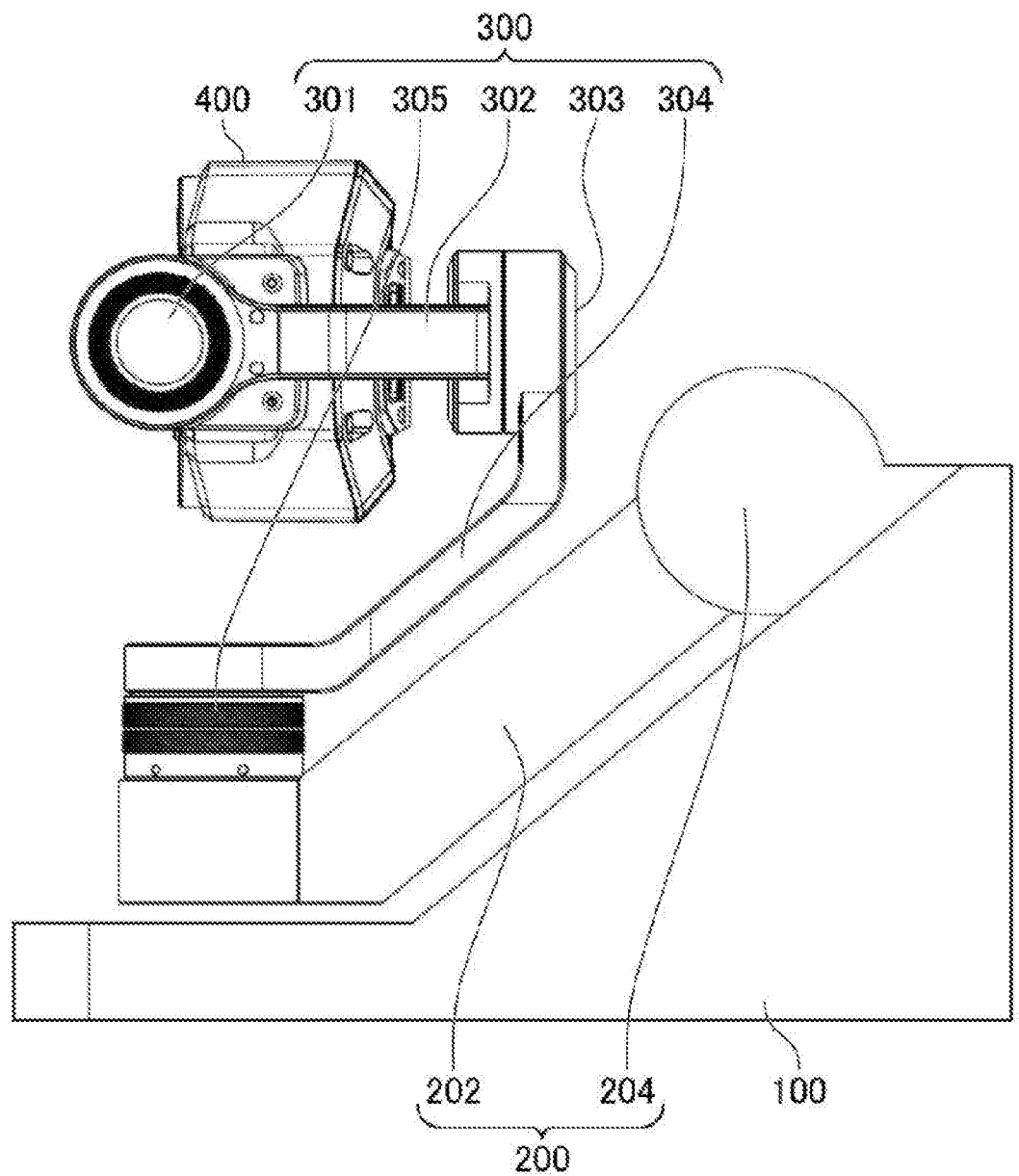
FIG. 2 is a schematic side view of an example camera system consistent with embodiments of the disclosure.

FIG. 1 is a schematic perspective view of an example camera system 10 consistent with the disclosure. FIG. 2 is a schematic side view of the camera system 10 consistent with the disclosure.

As shown in FIGS. 1 and 2, the camera system 10 includes a main body 100, a holding mechanism 200, a gimbal 300, and a lens mount 400. The lens mount 400 includes an image sensor 430. The lens mount 400 can detachably hold a lens unit. The holding mechanism 200 can movably hold the gimbal 300 along a Z-axis (e.g., a yaw axis) direction with respect to the main body 100. The holding mechanism 200 includes a holding member 202 and a rotation member 204. The holding member 202 is fixed to the main body 100 via the rotation member 204. The holding member 202 can hold the gimbal 300. The rotation member 204 can be rotatably connected to one end of the holding member 202, and the gimbal 300 can be connected, rotatably around the yaw axis, to another end of the holding member 202. The rotation member 204 can include an actuator including a rotor, and can be driven by the actuator to rotate.

The gimbal 300 is an example of a support mechanism rotatably supporting the lens mount 400 and the image sensor 430. The lens mount 400 can include a housing accommodating the image sensor 430, and the gimbal 300 may rotatably support the housing. The gimbal 300 can support the lens mount 400 and the image sensor 430 to rotate around an X axis (e.g., a pitch axis) by using the actuator. The gimbal 300 can support the lens mount 400 and the image sensor 430 to further rotate around a Y axis (e.g., a roll axis) and the Z axis (e.g., the yaw axis) by using the actuator. The gimbal 300 may rotate the lens mount 400 and the image sensor 430 around at least one of the yaw axis, the pitch axis, or the roll axis to change an attitude of the image sensor 430.

The gimbal 300 includes a rotation member 301, a rotation member 303, a rotation member 305, a support member 302, and a support member 304. Each of the rotation member 301, the rotation member 303, and the rotation member 305 can include an actuator including a rotor. The rotation member 301 is arranged at one end of the support member 302. The rotation member 303 is arranged at another end of the support member 302. Another end of the support member 302 is connected to one end of the support member 304 via the rotation member 303. The rotation member 305 is arranged at another end of the support member 304. Another end of the support member 304 is connected to another end of the holding member 202 via the rotation member 305. The support member 302 can support the lens mount 400 and the image sensor 430 in such a manner that the lens mount 400 and the image sensor 430 can rotate around the pitch axis through the rotation portion 301. The support member 302 is an example of a first support member, which can support the lens mount 400 and the image sensor 430 in a manner that the lens mount 400 and the image sensor 430 can rotate along a vertical pivoting direction. The support member 304 can support the support member 302 in such a manner that the lens mount 400 and the image sensor 430 can rotate around the roll axis through the rotation member 303. The support member 304 is an example of a second support member, which can support the support member 302 in such a manner that the lens mount 400 and the image sensor 430 can rotate around the roll axis. The support member 304 can be supported by the holding member 202 in such a manner that the lens mount 400 and the image sensor 430 can rotate in a horizontal pivoting direction through the rotation member 305.

The lens mount 400 can detachably hold the lens unit including at least one lens. The lens unit may include an interchangeable lens.

Various types of lens units can be detachably mounted to the lens mount 400 in the camera system 10 described above. However, there are also lens units that do not meet a standard of the lens mount 400. In order to enable the lens mount 400 to hold the lens units not meeting the standard, the camera system 10 may further include a mount adapter connecting the lens mount 400 and the lens unit.

Figure 3:
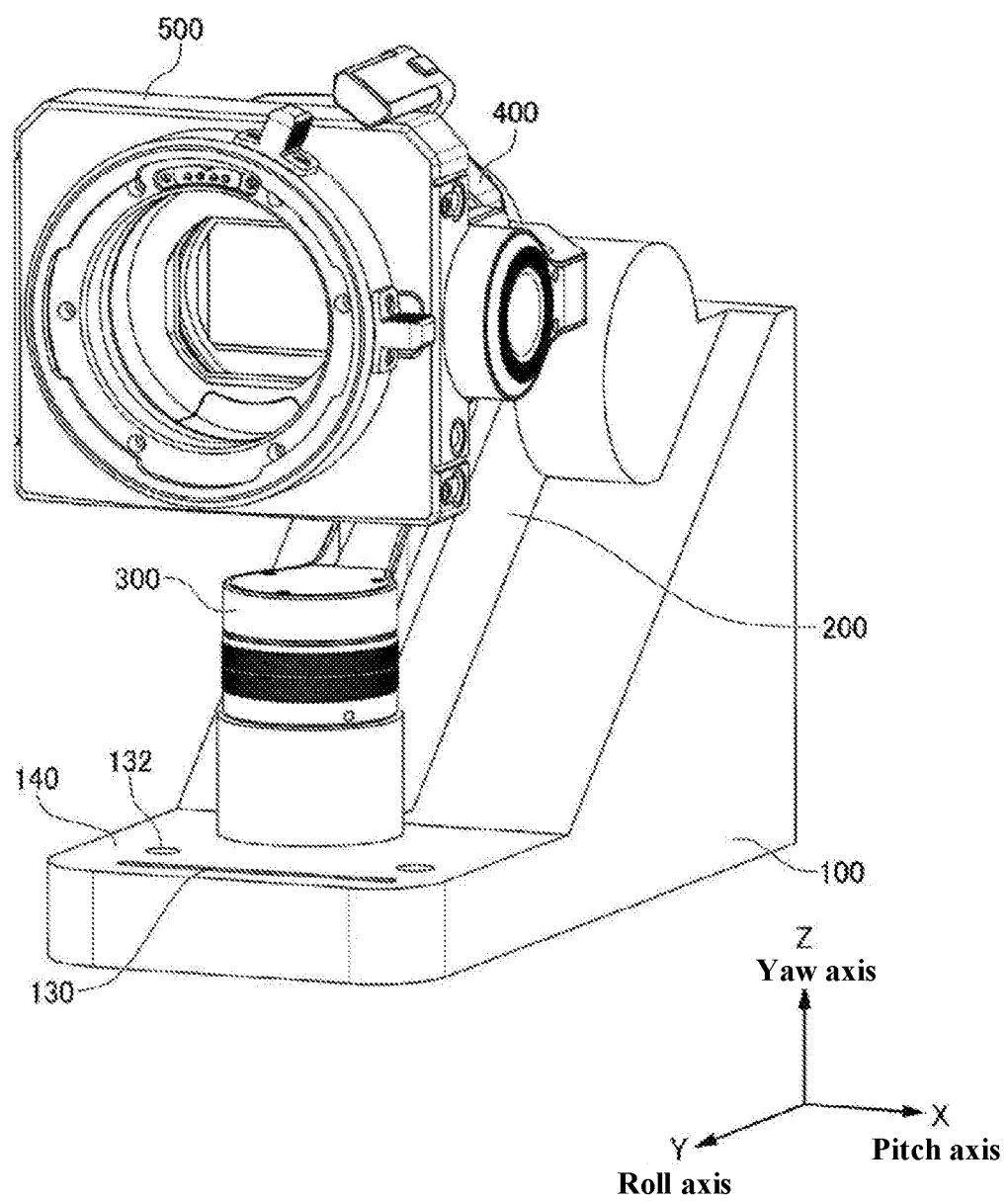
FIG. 3 is a schematic perspective view of an example camera system mounted with a mount adapter consistent with embodiments of the disclosure.
Figure 4:
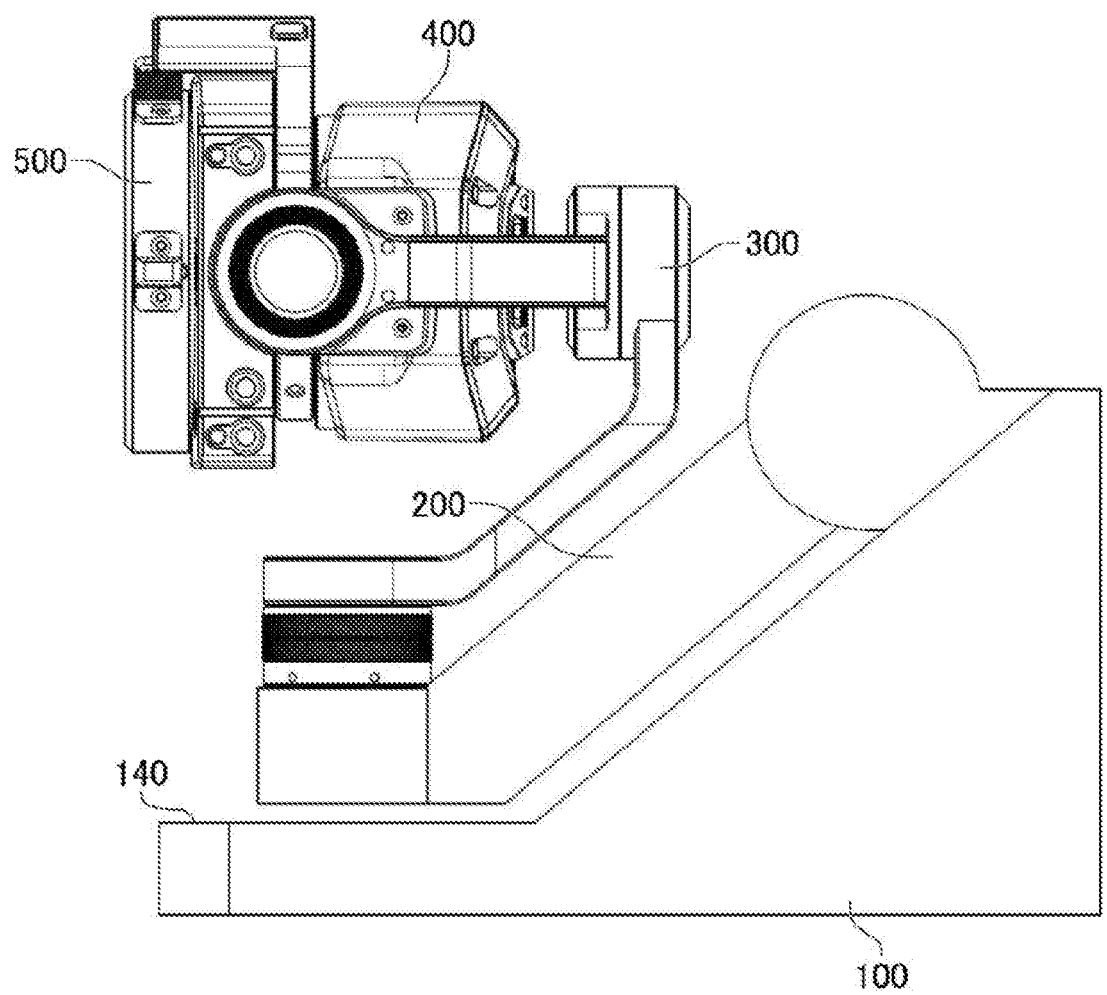
FIG. 4 is a schematic side view of an example camera system mounted with a mount adapter consistent with embodiments of the disclosure.

FIG. 3 is a schematic perspective view of the camera system 10 with a mount adapter 500 mounted to the lens mount 400 consistent with the disclosure. FIG. 4 is a schematic side view the camera system 10 with the mount adapter 500 mounted to the lens mount 400 consistent with the disclosure. The mount adapter 500 can include a mount structure complying with the standard of the lens mount 400 (e.g., a standard of the lens unit that can be mounted to the lens mount 400). Various types of lens units can be mounted to the lens mount 400 using the mount adapter 500.

However, there are also lens units that are difficult to be stably supported by the gimbal 300 due to their large weights, long lengths, or the like. For example, there are also lens units with which it is difficult to maintain a position of the lens mount 400 relative to the main body 100. Thus, the camera system 10 may further include a support that can support the lens mount 400 to maintain the position of the lens mount 400 relative to the main body 100.

Figure 5:
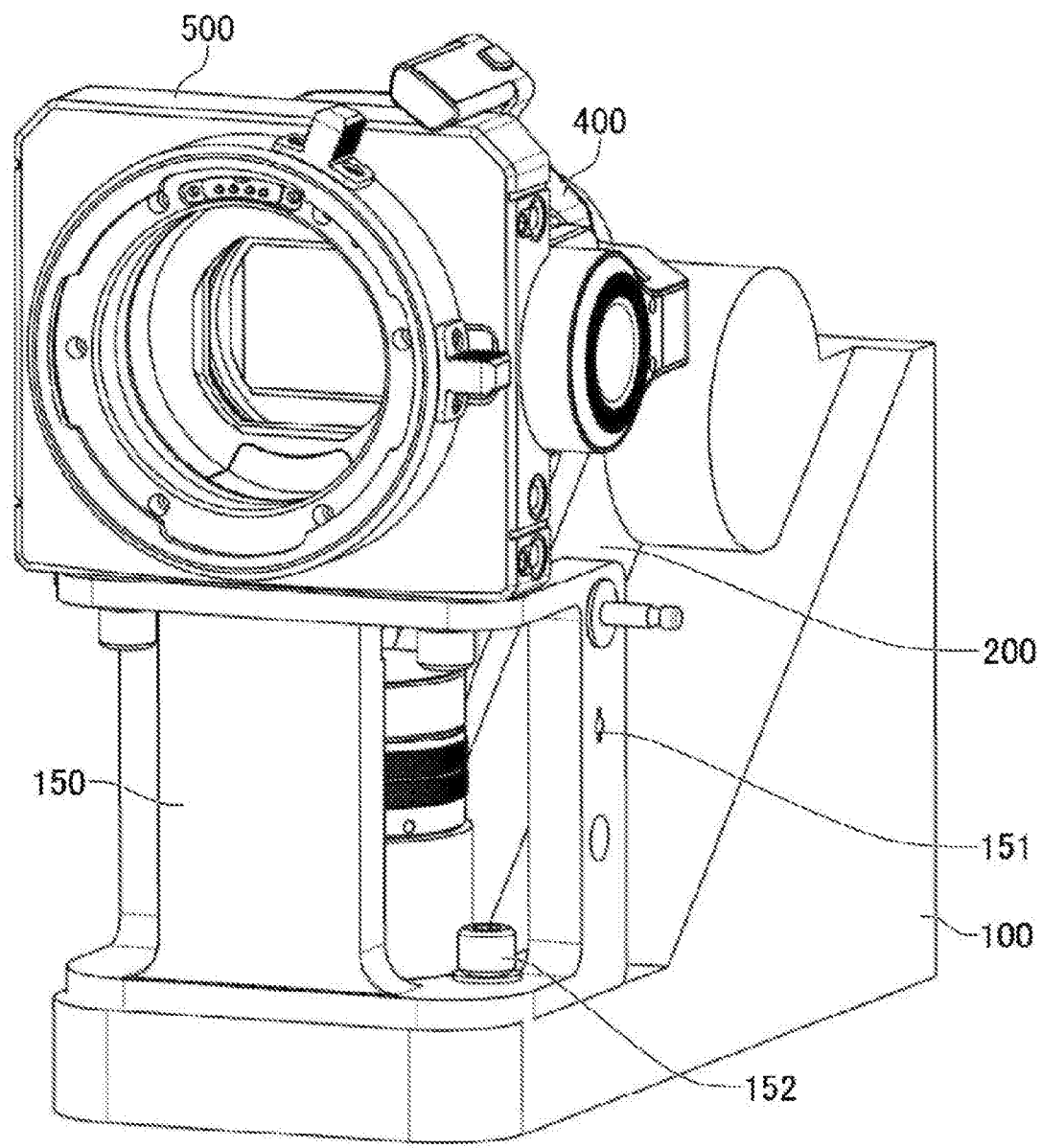
FIG. 5 is a schematic perspective view of an example system mounted with a support consistent with embodiments of the disclosure.
Figure 6:
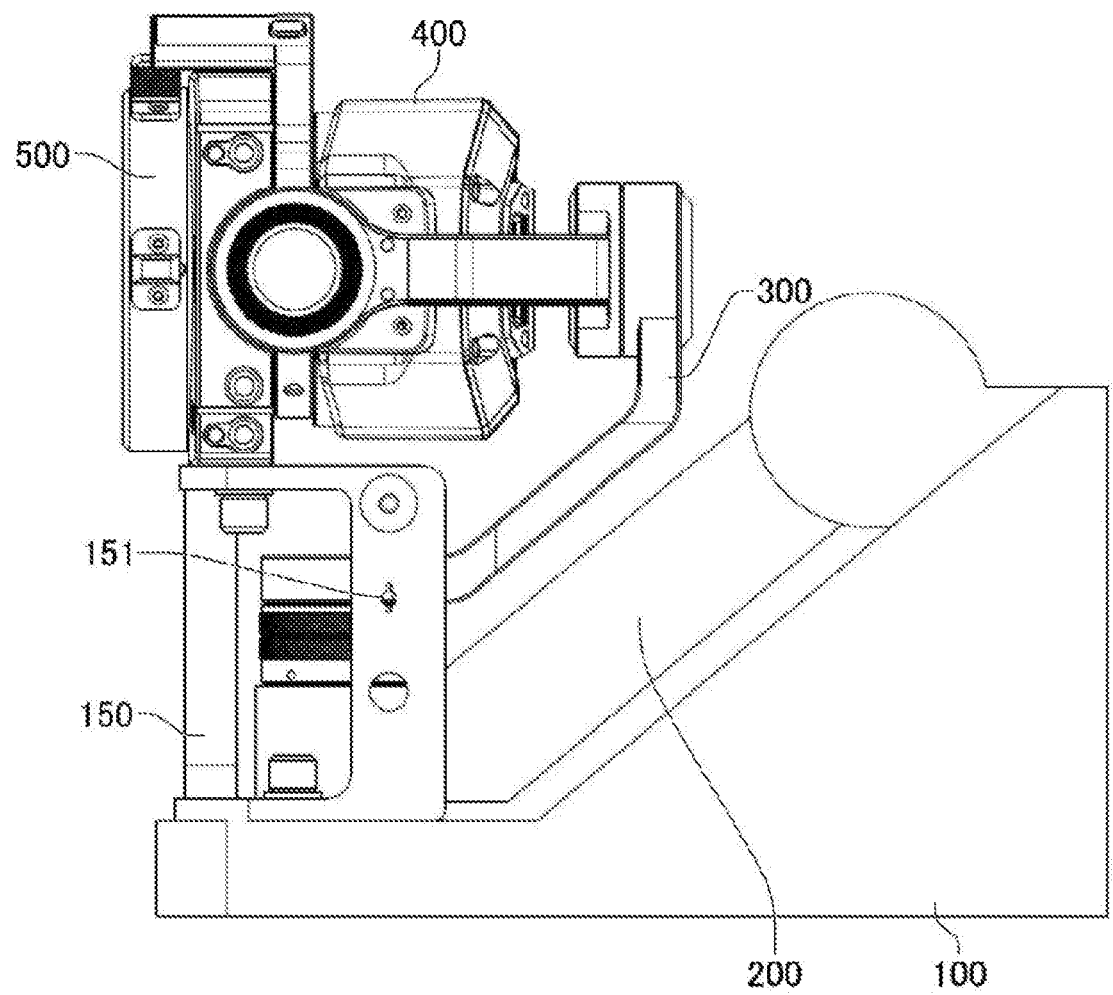
FIG. 6 is a schematic side view of an example camera system mounted with a support consistent with embodiments of the disclosure.

FIG. 5 is a schematic perspective view of the camera system 10 with a support 150 mounted to the main body 100 consistent with the disclosure. FIG. 6 is a schematic side view of the camera system 10 with the support 150 mounted to the main body 100 consistent with the disclosure.

The support 150 can support the lens mount 400 to maintain the position of the lens mount 400 relative to the main body 100. The support 150 may be fixedly mounted to the main body 100 and the lens mount 400. The support 150 may be fixedly mounted to the main body 100 via a bolt 152. The support 150 can include a through hole larger than an outer diameter of the bolt 152. The bolt 152 can be screwed to the main body 100 via the through hole. The support 150 includes a mark 151 indicating a position of an imaging surface of the image sensor 430 on an outer surface. The support 150 may include the mark 151 on a side of the support 150. In some embodiments, when the lens mount 400 is supported by the support 150, the gimbal 300 does not control the attitude of the lens mount 400. That is, the gimbal 300 does not work when the lens mount 400 is supported by the support 150.

Referring again to FIGS. 3 and 4, the main body 100 includes a fixation surface 140 for fixing the support 150. The fixation surface 140 is located below the lens mount 400 and the mount adapter 500. The main body 100 may include a detection sensor 132 on the fixation surface 140 for detecting if the support 150 is mounted to the main body 100. The detection sensor 132 may include a mechanical switch that can be turned on in response to the support 150 being mounted to the fixation surface 140. The detection sensor 132 may include an electrical element that can be electrically conductive in response to the support 150 being mounted to the fixation surface 140.

The gimbal 300 can stably support various lens units by supporting the lens mount 400 through the support 150. In some embodiments, the support 150 may not be fixedly mounted to the mount adapter 500 but to the lens mount 400. In some other embodiments, the support 150 may also be fixedly mounted to the mount adapter 500 and the lens mount 400.

Figure 7:
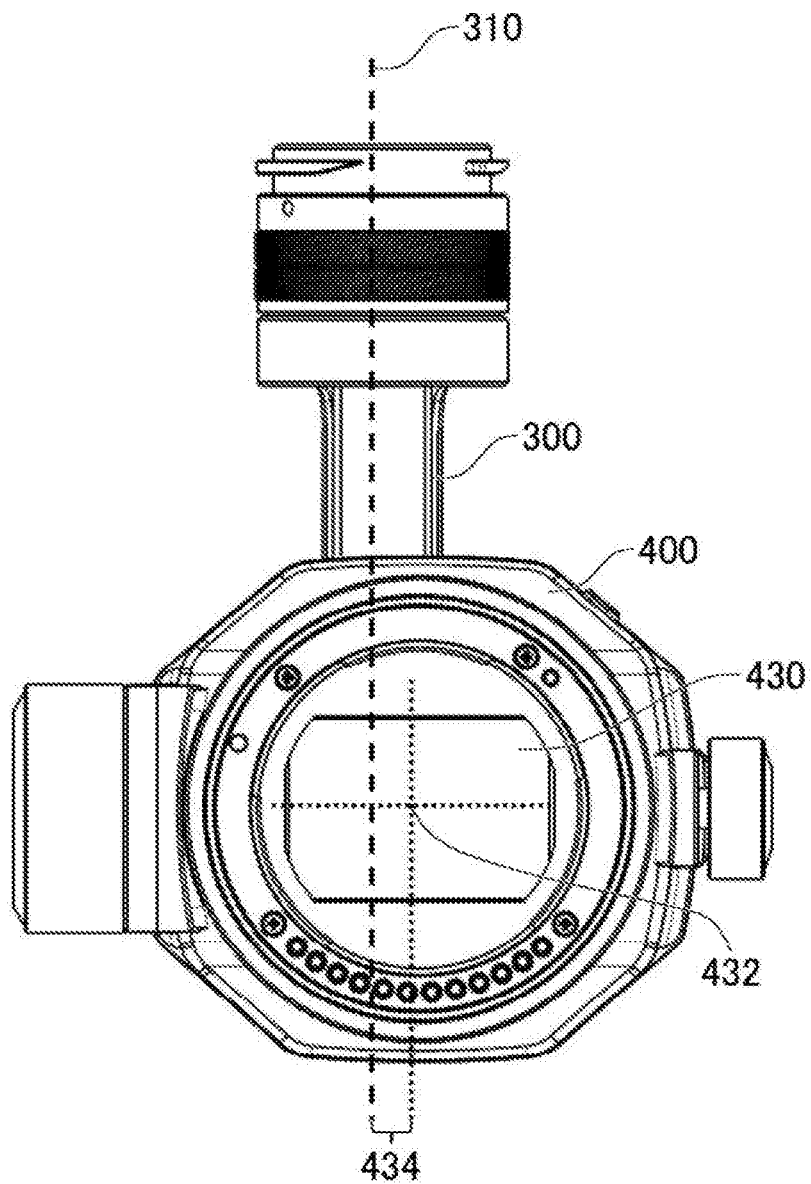
FIG. 7 shows a distance between a yaw axis of a gimbal and a center of an image sensor mounted at a lens mount consistent with embodiments of the disclosure.

There may be individual differences in the position of the lens mount 400 relative to the main body 100. There may be individual differences in a positional relationship between the gimbal 300 supported by the main body 100 and the lens mount 400. FIG. 7 shows a distance 434 between a yaw axis 310 of the gimbal 300 and a center 432 of the image sensor 430 mounted to the lens mount 400 consistent with the disclosure. For example, as shown in FIG. 7, there are individual differences in the distance between the yaw axis 310 of the gimbal 300 and the center 432 of the image sensor 430 mounted to the lens mount 400. There are also individual differences in the positional relationship between the mount adapter 500 mounted to the lens mount 400 and the main body 100. When the support 150 is tried to be fixedly mounted to the main body 100 and the mount adapter 500, the support 150 may be unable to be fixedly mounted to the main body 100 and the mount adapter 500 due to a position offset of the mount adapter 500 relative to the main body 100. If the support 150 is forcibly mounted to the main body 100 and the mount adapter 500, a load can be applied to the gimbal 300, which may adversely affect the gimbal 300.

Figure 8:
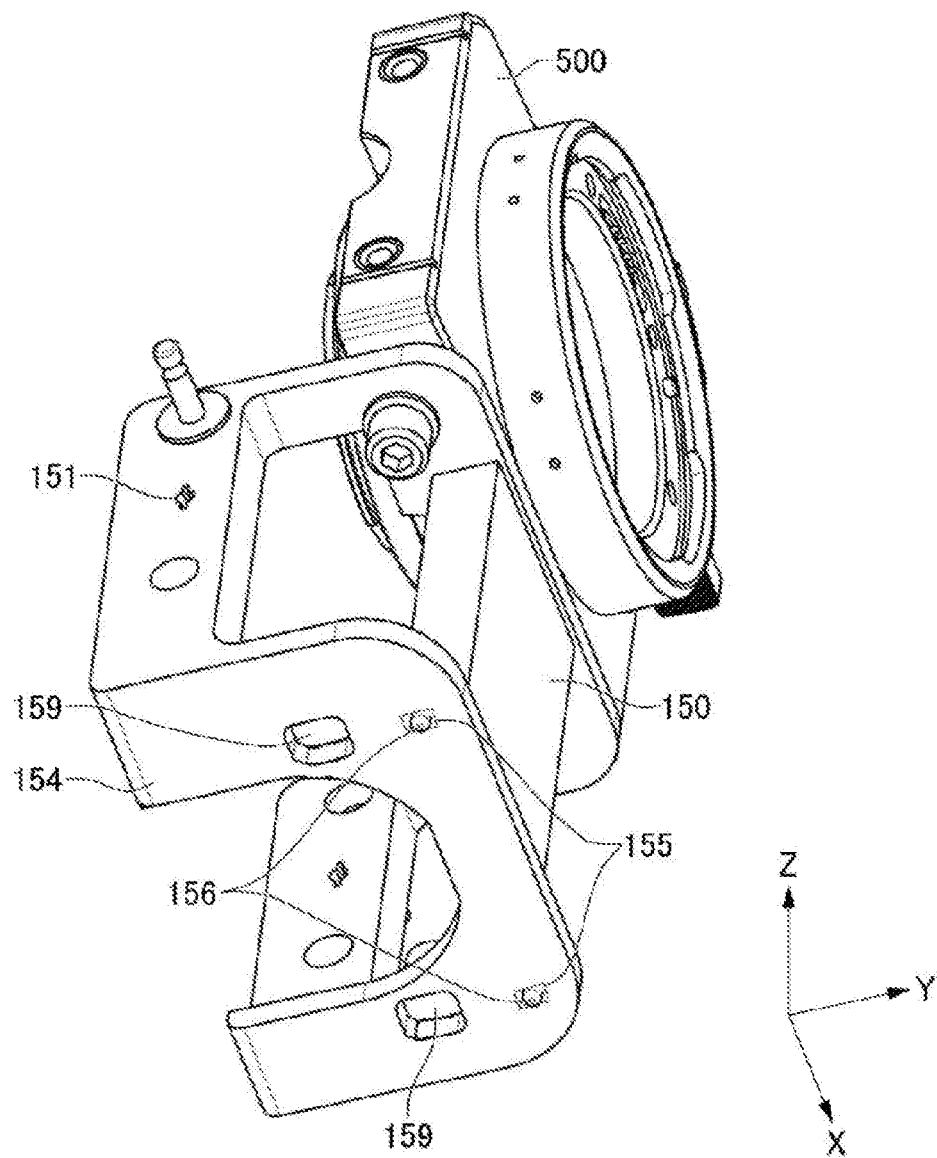
FIG. 8 is a schematic perspective view of a support viewed from a bottom side consistent with embodiments of the disclosure.

Therefore, the support 150 may further include an adjustment mechanism that can adjust the fixed position of the support 150 relative to the fixation surface 140 by moving the support 150 along the fixation surface 140. For example, referring again to FIG. 3, the main body 100 includes a rail 130 extending in a first direction (e.g., the X direction) along the fixation surface 140 on the fixation surface 140. The rail 130 is an example of a first rail. The rail 130 may include a groove arranged on the fixation surface 140. FIG. 8 is a schematic perspective view of the support 150 viewed from a bottom side 154 consistent with the disclosure. As shown in FIG. 8, the support 150 includes a pin 156 on the bottom side 154 opposite to the fixation surface 140, and the pin 156 can guide the support 150 to move along the rail 130. The support 150 may include a rail 155 on the bottom side 154 that can guide the pin 156 to move in a second direction (e.g., the Y direction). The pin 156 can guide the support 150 to move along the rail 130 to adjust the position of the support 150 in the X direction relative to the fixation surface 140 of the main body 100. By moving the pin 156 along the rail 155 on the bottom side 154 of the support 150, the position of the support 150 in the Y direction relative to the fixation surface 140 of the main body 100 can be adjusted. Since the support 150 includes the adjustment mechanism, even if the lens mount 400 is shifted in the X direction or the Y direction relative to the main body 100, the support 150 can be firmly mounted to the main body 100 and the mount adapter 500 or the lens mount 400. A through hole 159 of the bottom side 154 can be a hole for the bolt 152 to pass through.

The holding mechanism 200 can hold the gimbal 300 in such a way that the lens mount 400 can move closer to or away from the fixation surface 140. The holding mechanism 200 includes the rotation member 204 that can rotate the holding member 202 holding the gimbal 300 with respect to the main body 100 around an axis (e.g., the pitch axis) of the fixation surface 140. Therefore, the holding mechanism 200 can adjust a height of the lens mount 400 from the fixation surface 140. Therefore, it is possible to prevent the support 150 from being unable to be fixed to the mount adapter 500 or the lens mount 400 due to the position offset of the lens mount 400 relative to the main body 100 in the Z direction.

Figure 9:
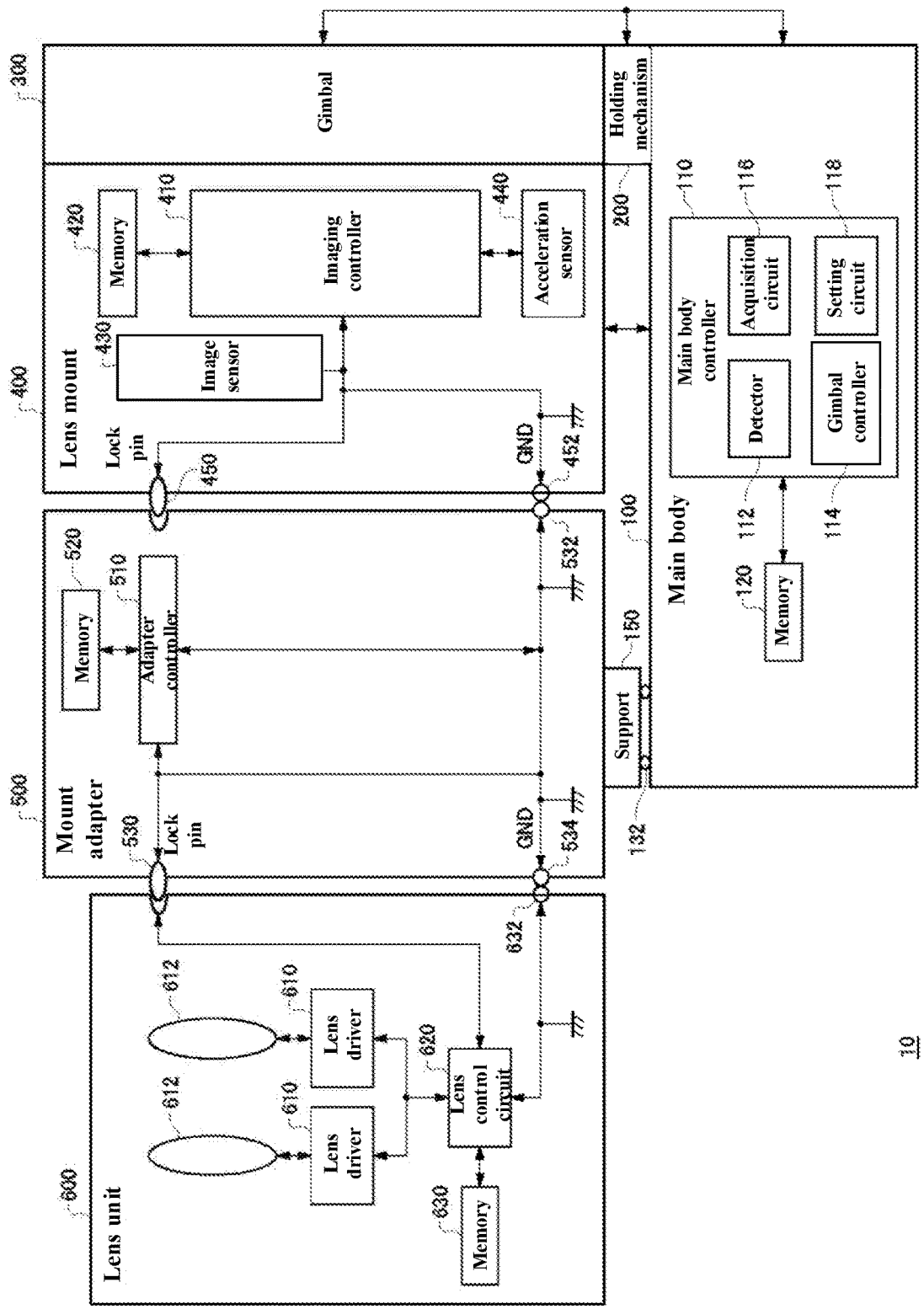
FIG. 9 is schematic block diagram of an example camera system consistent with embodiments of the disclosure.

FIG. 9 is a schematic block diagram of the camera system 10 consistent with the disclosure. The camera system 10 includes the main body 100, the holding mechanism 200, the gimbal 300, the lens mount 400, the mount adapter 500, the support 150, and a lens unit 600.

The main body 100 includes a main body controller 110, a memory 120, and the detection sensor 132. The main body controller 110 can control the camera system 10. The main body controller 110 is an example of a control device. The main body controller 110 may include a microprocessor, e.g., a central processing unit (CPU) or a microprocessing unit (MPU), a microcontroller, e.g., a microcontroller (MCU), or the like. The memory 120 can store programs and the like that are necessary for the main body controller 110 to control the holding mechanism 200, the gimbal 300, the lens mount 400, the mount adapter 500, and the lens unit 600. The memory 120 may include a computer-readable medium, and may include at least one of a static random-access memory (SRAM), a dynamic random-access memory (DRAM), an erasable programmable read-only memory (EPROM), an electrically erasable programmable read-only memory (EEPROM), or a flash memory, e.g., a universal serial bus (USB) memory. The memory 120 may be arranged inside the main body 100. The memory 120 can be detachable from the main body 100. The detection sensor 132 can detect if the support 150 is mounted to the main body 100.

The lens mount 400 includes the image sensor 430, an imaging controller 410, a memory 420, and an acceleration sensor 440. The image sensor 430 may include a charge-coupled device (CCD) or a complementary metal oxide semiconductor (CMOS). The image sensor 430 can shoot an optical image imaged via the lens unit 600 and output shot image data to the imaging controller 410. The imaging controller 410 may include a microprocessor, e.g., a CPU or an MPU, a microcontroller, e.g., an MCU, or the like. The imaging controller 410 can control the lens mount 400 according to an operation instruction from the main body controller 110. The memory 420 may include a computer-readable medium, and may include at least one of a SRAM, a DRAM, an EPROM, an EEPROM, or a flash memory, e.g., a USB memory. The memory 420 can store programs and the like that are necessary for the imaging controller 410 to control the image sensor 430 and the like. The memory 420 can be arranged inside the housing of the lens mount 400. The memory 420 can be detachable from the housing of the lens mount 400. The acceleration sensor 440 may include a three-axis acceleration sensor for detecting the attitude of the lens mount 400 and an attitude of the image sensor 430.

The lens unit 600 includes a plurality of lenses 612, a plurality of lens drivers 610, a lens controller 620, and a memory 630. The plurality of lenses 612 can function as zoom lenses, variable focal length lenses, and focus lenses. At least some or all of the plurality of lenses 612 can be configured to move along an optical axis. The lens unit 600 may include an interchangeable lens that can be detachably arranged at the lens mount 400. The plurality of lens drivers 610 can drive at least some or all of the plurality of lenses 612 to move along the optical axis via a mechanism member such as a convex wheel ring. Each lens driver 610 may include the actuator. The actuator may include a stepper motor. The lens controller 620 can drive the plurality of lens drivers 610 according to lens control instructions from the lens mount 400, and move one or more of the plurality of lenses 612 along the optical axis direction via the mechanism member. The lens control instructions can include, for example, a zoom control instruction and a focus control instruction.

The mount adapter 500 includes an adapter controller 510 and a memory 520. The mount adapter 500 can be detachably mounted to the lens mount 400 via a lock pin 450. The mount adapter 500 can be detachably mounted to the lens unit 600 via a lock pin 530. The mount adapter 500 includes a contact 532 for communicating with the lens mount 400. The lens mount 400 includes a contact 452 for communicating with the mount adapter 500. The mount adapter 500 includes a contact 534 for communicating with the lens unit 600. The lens unit 600 includes a contact 632 for communicating with the mount adapter 500.

The adapter controller 510 can receive a first control signal conforming to a first communication standard from the imaging controller 410 that can control the image sensor 430, convert the first control signal into a second control signal conforming to a second communication standard, and send the second control signal to the lens unit 600. The adapter controller 510 is an example of a conversion circuit. Even if the communication standard of the lens mount 400 and the communication standard of the lens unit 600 are different, the adapter controller 510 can convert the control signal according to the communication standards to allow the lens mount 400 and the lens unit 600 to communicate with each other.

The adapter controller 510 may include a microprocessor, e.g., a CPU or an MPU, a microcontroller, e.g., an MCU, or the like. The memory 520 can store programs and the like that are necessary for controlling the adapter controller 510. The memory 520 may include a computer-readable medium, and may include at least one of a SRAM, a DRAM, an EPROM, an EEPROM, or a flash memory, e.g., a USB memory. The memory 520 may be arranged inside the mount adapter 500. The memory 520 can be detachable from the mount adapter 500.

When the support 150 is fixedly mounted to the main body 100 and the mount adapter 500, if the gimbal 300 forcibly controls the attitude of the lens mount 400, there is a possibility that the gimbal 300 may be overloaded. As the gimbal 300 forcibly changes the attitude of the lens mount 400, the gimbal 300 may malfunction. Therefore, when the support 150 is fixedly mounted to the main body 100 and the mount adapter 500, the gimbal 300 may not control the attitude of the lens mount 400.

The main body controller 110 includes a detector 112 (detector circuit), a gimbal controller 114, an acquisition circuit 116, and a setting circuit 118. The detector 112 can be configured to detect if the support 150 is mounted to the camera system 10. The detector 112 can be configured to detect if the support 150 is mounted to the main body 100 via the detection sensor 132. The detector 112 can be configured to detect if the support 150 is mounted to the mount adapter 500. The detector 112 can be configured to detect if the support 150 is mounted to the mount adapter 500 via the lens mount 400.

The gimbal controller 114 can be configured to control the gimbal 300, such that the rotation of the lens mount 400 and the image sensor 430 can be restricted when the detector 112 detects that the support 150 is mounted to the camera system 10. When the detector 112 detects that the support 150 is mounted to the camera system 10, the gimbal controller 114 may control the gimbal 300 not to rotate the lens mount 400 and the image sensor 430.

When the support 150 is not mounted to the camera system 10, the gimbal controller 114 can drive the gimbal 300 as an initial operation in response to a power on of the camera system 10, and perform a calibration to adjust the attitude of the lens mount 400 and the attitude of the image sensor 430. The gimbal controller 114 can perform the calibration to correct the positions, such that the actual attitudes of the lens mount 400 and the image sensor 430 (e.g., rotation positions around the pitch axis, roll axis and yaw axis) can coincide with the attitudes of the lens mount 400 and the image sensor 430 recognized by the gimbal controller 114 (e.g., the rotation positions of the pitch axis, roll axis, and yaw axis).

When the support 150 is mounted to the camera system 10, if the gimbal controller 114 performs the calibration, the gimbal 300 or the lens mount 400 may be adversely affected. Thus, when the detector 112 detects that the support 150 is mounted to the camera system 10, the gimbal controller 114 can control the gimbal 300, such that the lens mount 400 and the image sensor 430 can be rotated to restrict the calibration for adjusting the attitudes of the lens mount 400 and the image sensor 430. When the detector 112 detects that the support 150 is mounted to the camera system 10, the gimbal controller 114 may control the gimbal 300 not to perform the calibration.

The detector 112 can also detect if the mount adapter 500 is mounted to the lens mount 400. The detector 112 can detect if the mount adapter 500 is mounted to the lens mount 400 via the lens mount 400. When the detector 112 detects that the support 150 is mounted to the camera system 10 and the mount adapter 500 is mounted to the lens mount 400, the gimbal controller 114 may control the gimbal 300 to restrict the rotation of the lens mount 400 and the image sensor 430. When the detector 112 detects that the support 150 is mounted to the camera system 10 and the mount adapter 500 is mounted to the lens mount 400, the gimbal controller 114 may control the gimbal 300 not to rotate the lens mount 400 and the image sensor 430.

Generally, the gimbal 300 can generate a holding force against an external force to maintain the attitudes of the lens mount 400 and the image sensor 430. The gimbal controller 114 can control a voltage applied to a driving portion of each axis of the gimbal 300 to generate the desired holding force against the external force to maintain the attitudes of the lens mount 400 and the image sensor 430.

When the support 150 is mounted to the camera system 10, the gimbal 300 does not need to generate the holding force against the external force to maintain the attitudes of the lens mount 400 and the image sensor 430. Thus, compared with the case where the detector 112 does not detect that the mount adapter 500 is mounted to the lens mount 400, when the detector 112 detects that the mount adapter 500 is mounted to the lens mount 400 and the support 150 is mounted to the camera system 10, the gimbal controller 114 can reduce the holding force of the gimbal 300 to maintain the attitudes of the lens mount 400 and the image sensor 430.

When the detector 112 does not detect that the mount adapter 500 is mounted to the lens mount 400, the gimbal controller 114 may control the gimbal 300 to maintain the attitudes of the lens mount 400 and the image sensor 430 at a predetermined first hold force. When the detecting circuit 112 detects that the mount adapter 500 is mounted to the lens mount 400 and the support 150 is mounted to the camera system 10, the gimbal controller 114 can control the gimbal to maintain the attitudes of the mount 400 and the image sensor 430 with a second holding force that is less than the first holding force.

The gimbal controller 114 can reduce the holding force generated by the gimbal 300 through reducing the voltage applied to the driving portion of the gimbal 300. The gimbal controller 114 can reduce a maximum holding force that can be applied to the driving portion of the gimbal 300. The gimbal controller 114 can reduce the holding force generated by the gimbal 300 through reducing a power supply voltage of a power supply that supplies electric power to the driving portion of the gimbal 300 below an initial set power supply voltage. By reducing the power supply voltage, the control voltage applied to the driving portion of the gimbal 300 can be also reduced. Therefore, the holding force generated by the gimbal 300 can be also reduced.

The gimbal controller 114 can reduce the holding force generated by the gimbal 300 through reducing a maximum control voltage applied to the driving portion of the gimbal 300 without changing the power supply voltage. The gimbal controller 114 can reduce the holding force generated by the gimbal 300 through reducing a maximum current input to the driving portion of the gimbal 300.

Among the lens units 600 mounted to the lens mount 400 through the mount adapter 500, there may be some lens units 600 having the light-weight and short-length. When the lens unit 600 having the light-weight and short-length is mounted to the mount adapter 500, even if the support 150 is not mounted to the camera system 10, the gimbal 300 can still stably maintain the attitude of the lens unit 600. That is, if the lens unit 600 is small, the holding force generated by the gimbal 300 for maintaining the attitude of the lens unit 600 may be lower than a normal holding force. Thus, when the detector 112 detects that the mount adapter 500 is mounted to the lens mount 400 and the support 150 is not mounted to the camera system 10, the gimbal controller 114 can control the gimbal 300 to maintain the attitudes of the lens mount 400 and the image sensor 430 at a third holding force less than the first holding force but greater than the second holding force.

In some embodiments, a driving range of the gimbal 300 can be limited according to the size (e.g., the length and diameter) of the lens unit 600. When the lens unit 600 having the relatively large size is mounted to the camera system 10, if the driving range of the gimbal 300 is large, the lens unit 600 may collide with the members of the camera system 10. Thus, the gimbal controller 114 can adjust the driving range of the gimbal 300 according to the size of the lens unit 600. The acquisition circuit 116 can obtain lens information including a size of the lens unit 600 held in the lens mount 400. The acquisition circuit 116 can obtain lens information stored in the memory 630 of the lens unit 600 for identifying the lens unit 600 via the lens mount 400. The setting circuit 118 can set the rotation range of the lens mount 400 and the image sensor 430 that relies on the gimbal 300, e.g., the driving range of the gimbal 300, according to the lens information. The gimbal controller 114 may control the gimbal 300 to cause the lens mount 400 and the image sensor 430 to rotate within the rotation range. The memory 120 may pre-store the driving ranges of the gimbal 300 corresponding to various types of lens unit 600. The setting circuit 118 can set the driving range of the gimbal 300 by specifying the type of the lens unit 600 according to the lens information and reading the driving range of the gimbal 300 associated with the type of the lens unit 600 from the memory 120.

Figure 10:
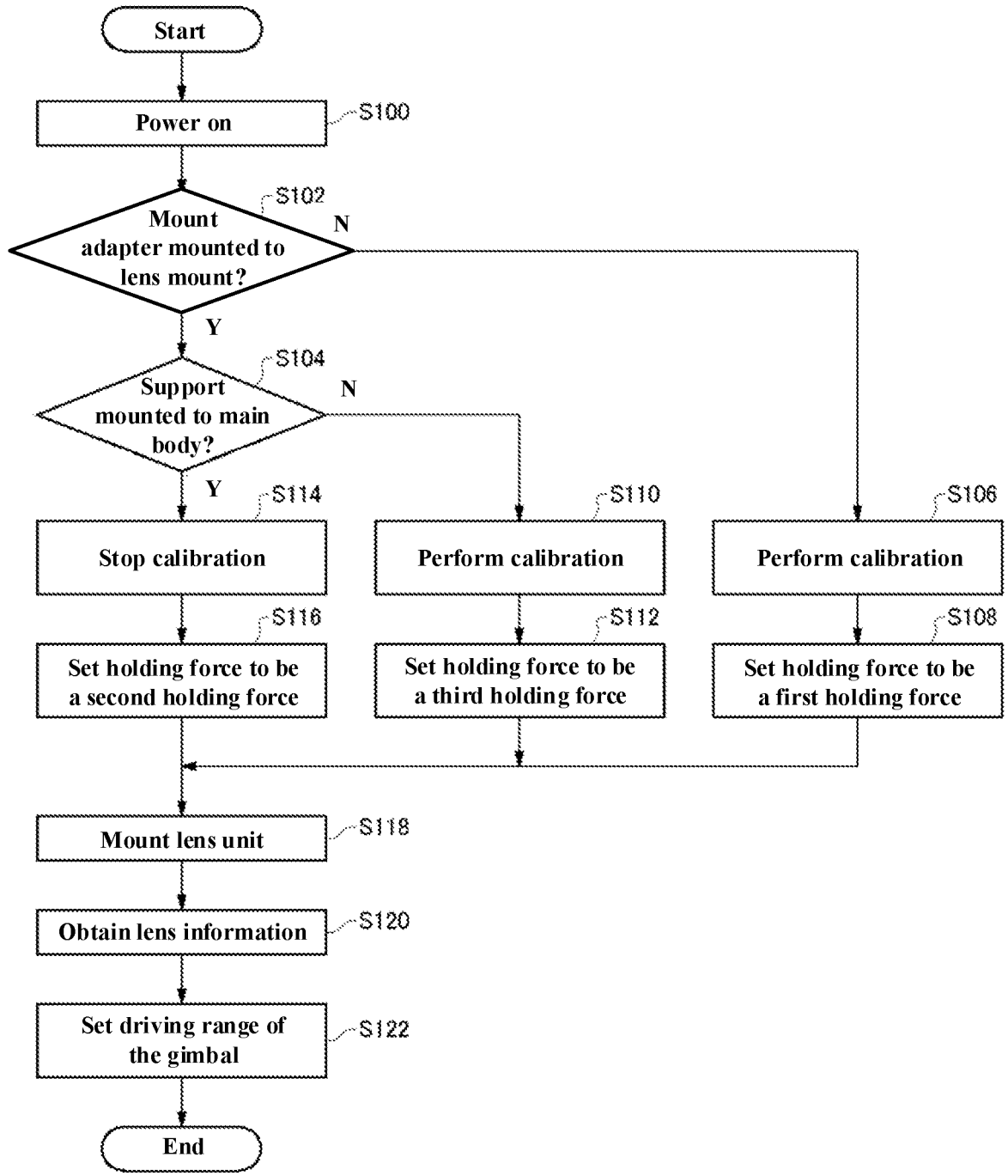
FIG. 10 is a schematic flow chart of example processes executed by a camera system when being powered on consistent with embodiments of the disclosure.

FIG. 10 is a schematic flow chart of example processes executed in the camera system 10 when being powered on consistent with the disclosure. As shown in FIG. 10, when the power of the camera system 10 is turned on (S100), the detector 112 determines whether the mount adapter 500 is mounted to the lens mount 400 (S102). If the mount adapter 500 is not mounted to the lens mount 400, the gimbal controller 114 performs the calibration of the gimbal 300 (S106). The gimbal controller 114 sets the holding force of the gimbal 300 to maintain the attitudes of the lens mount 400 and the image sensor 430 to be the first holding force (S108). The gimbal controller 114 can set the holding force of the gimbal 300 by setting a maximum voltage value applied to the gimbal 300 to be a predetermined first voltage value.

If the mount adapter 500 is mounted to the lens mount 400, the detector 112 determines whether the support 150 is mounted to the main body 100 (S104). If the support 150 is not mounted to the main body 100, the gimbal controller 114 performs the calibration of the gimbal 300 (S110). The gimbal controller 114 sets the holding force of the gimbal 300 for maintaining the attitudes of the lens mount 400 and the image sensor 430 to be the third holding force less than the first holding force but greater than the second holding force (S112). The gimbal controller 114 can set the holding force of the gimbal 300 by setting the maximum voltage value applied to the gimbal 300 to be a third voltage value less than the preset first voltage value but greater than a second voltage value.

If the mount adapter 500 is mounted to the lens mount 400 and the support 150 is mounted to the main body 100, the gimbal controller 114 stops the calibration of the gimbal 300 (S114). That is, the gimbal controller 114 does not perform the calibration of the gimbal 300 when the power is turned on. The gimbal controller 114 sets the holding force of the gimbal 300 for maintaining the attitudes of the lens mount 400 and the image sensor 430 to be the second holding force (S116). The gimbal controller 114 may set the holding force of the gimbal 300 by setting the maximum voltage value applied to the gimbal 300 to be the predetermined second voltage value. The gimbal controller 114 can set the holding force of the gimbal 300 by setting the maximum voltage value applied to the gimbal 300 to be 0V.

The lens unit 600 is mounted to the camera system 10 (S118). The lens unit 600 is mounted to the lens mount 400 via the mount adapter 500. In some embodiments, the lens unit 600 can be directly mounted to the lens mount 400 without the mount adapter 500. The acquisition circuit 116 obtains the lens information of the mounted lens unit 600 (S120). The setting circuit 118 sets the driving range of the gimbal 300 corresponding to the type of the lens unit 600 based on the lens information (S122). When the support 150 is mounted to the main body 100, the setting circuit 118 can set the driving range of the gimbal 300 to be zero.

Consistent with the disclosure, even when the lens unit 600 having the large weight or long length is mounted to the camera system 10, since the lens unit 600 is supported by the support 150, the gimbal 300 can stably support the attitude of the lens unit 600. When the support 150 is mounted to the camera system 10, the rotation of the lens mount 400 and the image sensor 430 that relies on the gimbal 300 can be restricted. Thus, when the supporting 150 is supporting the lens mount 400, the gimbal 300 can prevent the gimbal 300 from trying to forcibly rotate the lens mount 400 to cause a burden on the gimbal 300.

Figure 11:
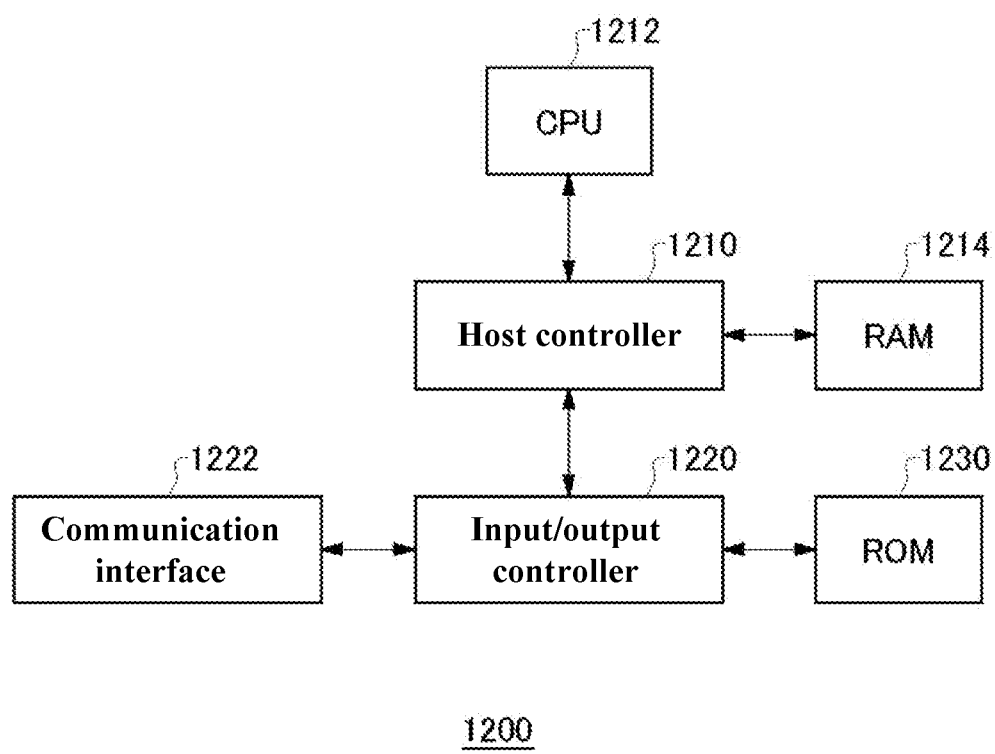
FIG. 11 is a schematic diagram of an example hardware configuration consistent with embodiments of the disclosure.

FIG. 11 is a schematic diagram of an example computer 1200 consistent with the disclosure. The computer 1200 is an example hardware configuration that can fully or partially represent one aspect of the present disclosure. A program installed on the computer 1200 can cause the computer 1200 to perform an operation associated with the device consistent with the disclosure or function as one or more "portions" of the device. In some embodiments, the program can cause the computer 1200 to perform the operation or function as the one or more "portions." The program can enable the computer 1200 to execute the process or stages of the process of the method consistent with the present disclosure. The program may be executed by a CPU 1212, such that the computer 1200 can execute specified operations associated with some or all blocks in the flowcharts and block diagrams described in this specification.

The computer 1200 includes the CPU 1212 and a RAM 1214. The CPU 1212 and the RAM 1214 can be connected to each other through a host controller 1210. The computer 1200 further includes a communication interface 1222 and an input/output circuit. The communication interface 1222 and the input/output circuit can be connected to the host controller 1210 through an input/output controller 1220. The computer 1200 further includes a ROM 1230. The CPU 1212 can operate, according to the programs stored in the ROM 1230 and RAM 1214, to control each unit.

The communication interface 1222 can communicate with other electronic devices through the network. The hard disk drive can store the program and data used by the CPU 1212 in the computer 1200. The ROM 1230 can store a boot program executed by the computer 1200 during operation, and/or a program dependent on the hardware of the computer 1200. The program can be provided by a computer-readable recording medium, e.g., a compact disc read-only memory (CR-ROM), a USB memory, an integrated circuit (IC) card, or the like, or a network. The program can be stored in a computer-readable recording medium, e.g., the RAM 1214 or ROM 1230, and can be executed by the CPU 1212. The information processing described in the program can be read by the computer 1200 and can cause a cooperation between the program and various types of hardware resources described above. The apparatus or method may be formed by using the computer 1200 to implement the operations or processing of information.

For example, when the computer 1200 communicates with an external device, the CPU 1212 can execute a communication program loaded in the RAM 1214, and instruct the communication interface 1222 to perform a communication processing according to the processing described in the communication program. Through the control of the CPU 1212, the communication interface 1222 can read transmission data stored in a transmission buffer provided in a recording medium such as RAM 1214 or USB memory, and send the read transmission data to the network, or write received data received from the network into a receiving buffer provided in the recording medium.

The CPU 1212 can cause the RAM 1214 to read all or required parts of files or databases stored in an external recording medium such as a USB memory, and perform various types of processing on the data on the RAM 1214. The CPU 1212 can write the processed data back to the external recording medium.

Various types of information such as various types of programs, data, tables, and databases can be stored in the recording medium and the information processing can be performed on the various types of information. The CPU 1212 can perform various types of operations described in various embodiments of the present disclosure, e.g., various types of operations specified by an instruction sequence of the program, information processing, conditional judgment, conditional transfer, unconditional transfer, information retrieval/replacement, or the like, on the data read from the RAM 1214, and write the results back to the RAM 1214. The CPU 1212 can retrieve information in files, databases, or the like, in the recording medium. For example, when a plurality of entries corresponding to attribute values of a first attribute associated with the attribute values of a second attribute are stored in the recording medium, the CPU 1212 may retrieve an entry matching a specified attribute value of the first attribute satisfying a predetermined condition from the plurality of entries, and read the attribute value of the second attribute stored in the entry, such that the attribute value of the second attribute that is associated with the first attribute satisfying the predetermined condition can be obtained.

The program or software modules described above may be stored on the computer 1200 or a computer-readable storage medium near the computer 1200. A recording medium such as a hard disk or RAM provided in a server system connected to a dedicated communication network or the Internet can be used as a computer-readable storage medium, such that the program can be provided to the computer 1200 via the network.

As long as the terms "before," "previous to," or the like, are not specifically stated, and an output of a previous processing is not used in a subsequent processing, the actions, sequences, steps and stages in the device, system, program and method shown in the claims, description and drawings can be implemented in any order. For the convenience of description, "first," "next," and the like are used to describe the operation procedures in the claims, specification and drawings, which do not mean that the operation procedures must be implemented in this order.

It is intended that the disclosed embodiments be considered as exemplary only and not to limit the scope of the disclosure. Changes, modifications, alterations, and variations of the above-described embodiments may be made by those skilled in the art within the scope of the disclosure.

What is claimed is:

1. A control device for controlling a photographing system comprising:
   a detector configured to detect whether a support is mounted at the photographing system, the support being configured to support a lens mount to maintain a position of the lens mount relative to a main body of the photographing system, and the photographing system further including an image sensor and a support mechanism configured to rotatably support the lens mount and the image sensor; and
   a controller configured to control the support mechanism to restrict a rotation of the lens mount and the image sensor in response to the detector detecting that the support is mounted at the photographing system.

2. The control device of claim 1, wherein the controller is further configured to control the support mechanism to, in response to the detector detecting that the support is mounted at the photographing system, restrict a calibration that adjusts attitudes of the lens mount and the image sensor by rotating the lens mount and the image sensor.

3. The control device of claim 1, wherein:
   the photographing system further includes a mount adapter configured to connect a lens unit and the lens mount;
   the support is fixed at the main body and the mount adapter;
   the detector is further configured to detect whether the mount adapter is mounted at the lens mount; and
   the controller is further configured to control the support mechanism to restrict the rotation of the lens mount and the image sensor in response to the detector detecting that the support is mounted at the photographing system and the mount adapter is mounted at the lens mount.

4. The control device of claim 3, wherein:
   the support mechanism is configured to generate a holding force against an external force to maintain attitudes of the lens mount and the image sensor; and
   the controller is further configured to, in response to the detector detecting that the mount adapter is mounted at the lens mount and the support is mounted at the photographing system, reduce the holding force of the support mechanism as compared to a scenario in which the detector does not detect that the mount adapter is mounted at the lens mount.

5. The control device of claim 4, wherein the controller is further configured to:
   in response to the detector not detecting that the mount adapter is mounted at the lens mount, control the support mechanism to maintain the attitudes of the lens mount and the image sensor with a first holding force; or
   in response to the detector detecting that the mount adapter is mounted at the lens mount and the support is mounted at the photographing system, control the support mechanism to maintain the attitudes of the lens mount and the image sensor with a second holding force less than the first holding force.

6. The control device of claim 5, wherein the controller is further configured to, in response to the detector detecting that the mount adapter is mounted at the lens mount but not detecting that the support is mounted at the photographing system, control the support mechanism to maintain the attitudes of the lens mount and the image sensor with a third holding force less than the first holding force but greater than the second holding force.

7. The control device of claim 1, further comprising:
   an acquisition circuit configured to obtain lens information related to a size of a lens unit mounted at the lens mount; and
   a setting circuit configured to set a rotation range of the lens mount and the image sensor relying on the support mechanism based on the lens information;
   wherein the controller is further configured to control the support mechanism to rotate the lens mount and the image sensor within the rotation range.

8. A method for controlling a photographing system comprising:
   detecting whether a support is mounted at the photographing system, the support being configured to support a lens mount to maintain a position of the lens mount relative to a main body of the photographing system, and the photographing system further including an image sensor and a support mechanism configured to rotatably support the lens mount and the image sensor; and
   controlling the support mechanism including restricting a rotation of the lens mount and the image sensor in response to detecting that the support is mounted at the photographing system.

9. The method of claim 8, wherein controlling the support mechanism further including, in response to detecting that the support is mounted at the photographing system, restricting a calibration that adjusts attitudes of the lens mount and the image sensor by rotating the lens mount and the image sensor.

10. The method of claim 8, wherein:
the photographing system further includes a mount adapter configured to connect a lens unit and the lens mount; and
the support is fixed at the main body and the mount adapter;
the method further comprising:
detecting whether the mount adapter is mounted at the lens mount;
wherein controlling the support mechanism further includes restricting the rotation of the lens mount and the image sensor in response to detecting that the support is mounted at the photographing system and the mount adapter is mounted at the lens mount.

11. The method of claim 10, wherein:
the support mechanism is configured to generate a holding force against an external force to maintain attitudes of the lens mount and the image sensor; and
controlling the support mechanism further includes, in response to the detector detecting that the mount adapter is mounted at the lens mount and the support is mounted at the photographing system, reducing the holding force of the support mechanism as compared to a scenario in which the detector does not detect that the mount adapter is mounted at the lens mount.

12. The method of claim 11, wherein controlling the support mechanism further includes:
in response to not detecting that the mount adapter is mounted at the lens mount, maintaining the attitudes of the lens mount and the image sensor with a first holding force; or
in response to detecting that the mount adapter is mounted at the lens mount and the support is mounted at the photographing system, maintaining the attitudes of the lens mount and the image sensor with a second holding force less than the first holding force.

13. The method of claim 12, wherein controlling the support mechanism further includes, in response to detecting that the mount adapter is mounted at the lens mount but not detecting that the support is mounted at the photographing system, maintaining the attitudes of the lens mount and the image sensor with a third holding force less than the first holding force but greater than the second holding force.

14. The method of claim 8, further comprising:
obtaining lens information related to a size of a lens unit mounted at the lens mount; and
setting a rotation range of the lens mount and the image sensor relying on the support mechanism based on the lens information;
wherein controlling the support mechanism further includes rotate the lens mount and the image sensor within the rotation range.

15. A non-transitory computer-readable storage medium storing a program that, when executed by a processor, causes the processor to:
detect whether a support is mounted at the photographing system, the support being configured to support a lens mount to maintain a position of the lens mount relative to a main body of the photographing system, and the photographing system further including an image sensor and a support mechanism configured to rotatably support the lens mount and the image sensor; and
control the support mechanism to restrict a rotation of the lens mount and the image sensor in response to detecting that the support is mounted at the photographing system.

16. The storage medium of claim 15, wherein the program further causes the processor to control the support mechanism to, in response to detecting that the support is mounted at the photographing system, restrict a calibration that adjusts attitudes of the lens mount and the image sensor by rotating the lens mount and the image sensor.

17. The storage medium of claim 15, wherein:
the photographing system further includes a mount adapter configured to connect a lens unit and the lens mount;
the support is fixed at the main body and the mount adapter; and
the program further causes the processor to:
detect whether the mount adapter is mounted at the lens mount; and
control the support mechanism to restrict the rotation of the lens mount and the image sensor in response to detecting that the support is mounted at the photographing system and the mount adapter is mounted at the lens mount.

18. The storage medium of claim 17, wherein:
the support mechanism is configured to generate a holding force against an external force to maintain attitudes of the lens mount and the image sensor; and
the program further causes the processor to control the support mechanism to, in response to the detector detecting that the mount adapter is mounted at the lens mount and the support is mounted at the photographing system, reduce the holding force of the support mechanism as compared to a scenario in which the detector does not detect that the mount adapter is mounted at the lens mount.

19. The storage medium of claim 18, wherein the program further causes the processor to control the support mechanism to:
in response to not detecting that the mount adapter is mounted at the lens mount, maintain the attitudes of the lens mount and the image sensor with a first holding force; or
in response to detecting that the mount adapter is mounted at the lens mount and the support is mounted at the photographing system, maintain the attitudes of the lens mount and the image sensor with a second holding force less than the first holding force.

20. The storage medium of claim 15, wherein the program further causes the processor to control the support mechanism to, in response to detecting that the mount adapter is mounted at the lens mount but not detecting that the support is mounted at the photographing system, maintain the attitudes of the lens mount and the image sensor with a third holding force less than the first holding force but greater than the second holding force.

* * * * *